United States Patent [19]

Nimry et al.

[11] Patent Number: 4,507,186

[45] Date of Patent: Mar. 26, 1985

[54] DIANHYDRIDES AND POLYIMIDES

[75] Inventors: Tayseer S. Nimry, Wheaton; Ellis K. Fields, River Forest, both of Ill.

[73] Assignee: Standard Oil Company (Indiana), Chicago, Ill.

[21] Appl. No.: 387,046

[22] Filed: Jun. 10, 1982

Related U.S. Application Data

[62] Division of Ser. No. 294,345, Aug. 19, 1981, Pat. No. 4,362,859.

[51] Int. Cl.$^3$ ............................................ C07D 307/77
[52] U.S. Cl. ................................ 204/158 R; 549/234
[58] Field of Search .................... 549/235; 204/158 R, 204/158 HE

[56] References Cited

U.S. PATENT DOCUMENTS

| 2,940,984 | 6/1960 | Applequist et al. | 549/235 |
| 3,423,431 | 1/1969 | Starr et al. | 549/235 |

FOREIGN PATENT DOCUMENTS

| 842268 | 5/1970 | Canada | 549/235 |

*Primary Examiner*—Lester L. Lee
*Attorney, Agent, or Firm*—Gunar J. Blumberg; William T. McClain; William H. Magidson

[57] ABSTRACT

Novel polyimides, copolyimides and molding compositions are prepared from novel dianhydrides such as bicyclo[4.2.0]octane-2,5 diphenyl-7,8-dimethyl,3,4,7,8-tetracarboxylic dianhydride and bicyclo[4.2.0] octane-7,8-dimethyl-3,4,7,8-tetracarboxylic acid dianhydride. The novel polyimides are useful as engineering plastics. The novel dianhydrides are useful for the preparation of the polyimides.

1 Claim, No Drawings

DIANHYDRIDES AND POLYIMIDES

This is a division of application Ser. No. 294,345, filed Aug. 19, 1981, now U.S. Pat. No. 4,362,859.

BACKGROUND OF THE INVENTION

1. Field of the Invention

The field of this invention relates to novel dianhydrides such as bicyclo[4.2.0]octane-7,8-dimethyl-3,4,7,8-tetracarboxylic acid dianhydride (I) and bicyclo[4.2.0]octane-2,5-diphenyl-7,8-dimethyl-3,4,7,8-tetracarboxylic dianhydride (II) and novel polyimides and copolyimides prepared from these dianhydrides and diamines. These novel polyimides and copolyimides are useful in preparing molded articles, fibers, laminates and coatings.

2. Background

British Pat. No. 570,858 discloses various processes for making fiber forming polymers. It is clear that neither the novel dianhydrides nor the polyimides and copolyimides prepared therefrom, which are useful as moldings, fibers, laminates and coatings, have been contemplated in the prior art.

The general objective of this invention is to provide novel dianhydrides. A more specific object is to provide novel polyimides and copolyimides based on I, II and diamines or mixtures of diamines. Another object is to provide copolymers based on either I or II and another dianhydride.

We have found that novel polyimides can be formed by reacting dianhydrides of the following structure:

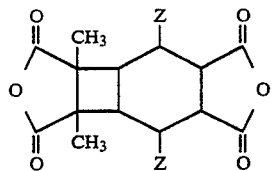

wherein Z is a hydrogen or benzene radical with diamines. These novel dianhydrides are prepared by a photocycloaddition reaction between dimethylmaleic anhydride and either 3,6-diphenyl-4 cyclohexene-1,2-dicarboxylic anhydride or cis-4-cyclohexene-1,2-dicarboxylic anhydride. Both I and II react readily with the diamine to form a high molecular weight polyimide or copolyimide. In the novel process aliphatic, cycloaliphatic, araliphatic and aromatic diamines can be polymerized with I or II in the melt to form high molecular weight polyimides and copolyimides.

Our process for the manufacture of the novel polyimides and copolyimides comprises reacting about equal molar amounts of the dianhydride with a primary diamine or a mixture of primary diamines. The molecular ratio of the dianhydride to the primary diamine may be in the range of 1.2 to 1 preferably in the range of 1 to 1. In suitable method, the reaction is conducted as a batch reaction at a temperature of about 130° to 300° C. for a period of about 2 to 8 hours in a nitrogen containing organic polar solvent such as N-methyl-2-pyrrolidinone, N,N-dimethylacetamide or pyridine. Either I or II can be replaced by another dianhydride up to 70 mole percent.

The other dianhydrides are characterized by the following formula:

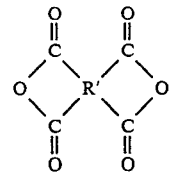

wherein R' is a tetravalent organic radical selected from the group consisting of aromatic, aliphatic, cycloaliphatic, heterocyclic, combination of aromatic and aliphatic, and substituted groups thereof. However, the preferred dianhydrides are those in which the R' groups have at least 6 carbon atoms wherein the 4 carbonyl groups of the dianhydride are each attached to separate carbon atoms and wherein each pair of carbonyl groups is directly attached to adjacent carbon atoms in the R' group to provide a 5-membered ring as follows:

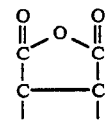

The preferred dianhydrides, as recited above, yield upon reaction with the diamines polyimide structures having outstanding physical properties. Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl)propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4-dicarboxyphenyl)ether dianhydride; ethylene tetracarboxylic dianhydride; 3,3',4,4'-benzophenonetetracarboxylic dianhydride; bis(3,4-dicarboxyphenyl)sulfide dianhydride; bis(3,4-dicarboxyphenyl)methane dianhydride; 1,4,5,8-naphthalenetetracarboxylic dianhydride; tricyclo[4,2,2,0$^{2,5}$]dec-7-ene-3,4,9,10-tetracarboxylic dianhydride; 3,6-ethenohexahydropyromellitic dianhydride; cyclobutane-1,2,3,4-tetracarboxylic dianhydride; and 1,3-dimethylcyclobutane-1,2,3,4-tetracarboxylic dianhydride. The polycondensation can also be carried out as a continuous process. The polycondensation can suitably be carried out at a temperature of 130° C. to 300° C., preferably at a temperature of 180° C. to 250° C. The novel polyimides of this invention have the following recurring structure wherein R is a divalent aliphatic or aromatic hydrocarbon radical and Z is a hydrogen or benzene radical:

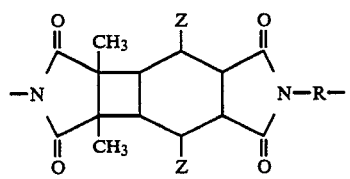

The radical R may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene

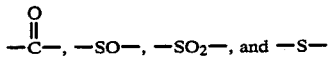

radicals. The radical R is derived from aliphatic, araliphatic or cycloaliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylene diamine, 4,4'-diaminodicyclohexylethane, xylylene diamine and bis(aminomethyl)cyclohexane. Suitable aromatic diamines useful in Applicant's process include para- and meta-phenylenediamine, 4,4'-oxydianiline, thiobis(aniline), sulfonylbis(aniline), diaminobenzophenone, methylenebis(aniline), benzidine, 1,5-diaminonaphthalene, oxybis(2-methylaniline), thiobis(2-methylaniline), and the like. Examples of other useful aromatic primary diamines are set out in U.S. Pat. No. 3,494,890 (1970) and U.S. Pat. No. 4,016,140 (1972) both incorporated herein by reference. The preferred diamines are hexamethylene diamine, dodecamethylene diamine and 4,4'-oxydianiline.

In some cases the polyimide or copolyimide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polyimide and can be conducted in several ways. However all techniques require heating the ground or pelletized polyimide below the melting point of the polyimide, generally at a temperature of about 175° C. to 300° C. while either sparging with an inert gas such as nitrogen or operating under vacuum. In cases where the polyimides have a low melt temperature, they can be polymerized in the melt under vacuum in thin sections or using thin film reactors known in the art.

Injection molding of the novel polyimides and copolyimides is accompanied by injecting the polyimides or copolyimides into a mold maintained at a temperature of about 25° C. to 150° C. In this process a 20 second to 1 minute cycle is used with a barrel temperature of about 125° C. to 350° C. The latter will vary depending on the Tg of the polymer being molded.

The novel polyimides and copolyimides have good thermal properties and can be molded into useful articles or formed into fibers, films, laminates or coatings. Infrared spectra of the polyimides have confirmed the polyimide structure.

Analysis of the polyimide by thermal gravimetric analysis shows excellent stability. Glass transition temperature Tg of the polyimide varied with the particular diamine used as shown in the Examples. Values range from a Tg of 60° C. to 180° C.

Diamines with the amino groups attached directly to the aromatic ring are suitably polymerized with the I or II by solution condensation in organic polar solvents. These include N,N-dimethylacetamide, N-methyl-2-pyrrolidinone, N,N-dimethylformamide, pyridine and the like. We have found that the polyimides and copolyimides of this invention are improved by the addition of reinforcing material. Suitably about 25 to 60 percent by weight of glass fibers, glass beads or graphite or mixtures of these can be incorporated into the polyimides and copolyimides. Any standard commercial grade fiber, especially glass fibers, may be used. Glass beads ranging from 5 mm to 50 mm in diameter may also be used as reinforcing material. Injection molding of the novel glass filled polyimide is accomplished by injecting the polyimide into a mold maintained at a temperature of about 50° C. to 150° C. In this process a 25 to 28 second cycle is used with a barrel temperature of about 125° C. to 350° C. The injection molding conditions are given in Table 1.

TABLE I

| | |
|---|---|
| Mold Temperature | 50° C. to 150° C. |
| Injection Pressure | 15,000 to 19,000 psi and held for 1 to 3 seconds |
| Back Pressure | 100 to 220 psi |
| Cycle Time | 25 to 28 seconds |
| Extruder: | |
| Nozzle Temperature | 125° C. to 350° C. |
| Barrels: | |
| Front heated to | 125° C. to 350° C. |
| Screw: | |
| 20 to 25 revolutions/minute | |

The following example illustrate the preferred embodiment of the invention. It will be understood that the examples are for illustrative purposes only and do not purport to be wholly definitive with respect to conditions or scope of the invention.

EXAMPE 1

Synthesis of Bicyclo[4.2.0]Octane-7,8-Dimethyl-3,4,7,8-Tetracarboxylic Acid Dianhydride (I)

I of the following structure:

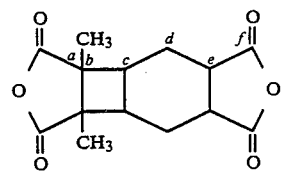

is a new photoadduct of dimethylmaleic anhydride (III) and cis-4-cyclohexene-1,2-dicarboxylic anhydride (IV). III, 6.31 g (50 mmole) and 7.61 g (50 mmole) of IV were placed in a 500 ml pyrex Erlenmeyer flask and dissolved in 100 ml of benzene. To this solution, 0.5 g of benzophenone was added. The flask was fitted with a condenser and then exposed to light from a GE sunlamp. A small quantity, 1.2 g, of the insoluble photodimer of III was initially formed and isolated. The solution was irradiated for approximately 50 hours. Upon cooling, I, which is moderately soluble in benzene, precipitated. It was filtered and dried in a vacuum oven at 110° C. for several hours. The yield, based on III that did not dimerize, was 65%. The melting point of the new dianhydride after recrystallization from acetic anhydride or acetone is 263°-6° C. Anal. Calcd. for $C_{14}H_{14}O_6$: C,60.43; H,5.07. Found: C,60.71; H,5.15. The $^{13}C$ nmr spectrum is consistent with the dianhydride structure given above for I:

| C atom | $^{13}C_{\delta tms}$ | C atom | $^{13}C_{\delta tms}$ |
|---|---|---|---|
| a | 16.4 ppm | d | 22.0 ppm |
| b | 51.0 | e | 38.3 |
| c | 35.2 | f | 175.4 |

Mass spectral analysis also confirms the configuration of I.

EXAMPLE 2

Synthesis of Bicyclo[4.2.0]Octane-2,5-Diphenyl-7,8-Dimethyl-3,4,7,8-Tetracarboxylic Acid Dianhydride (II)

II of the following structure:

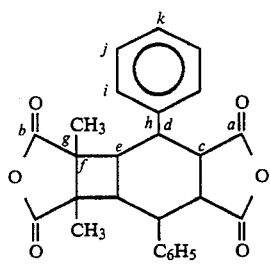

is preferred by the photocycloaddition of III to 3,6-diphenyl-4-cyclohexene-1,2-dicarboxylic anhydride (V). To a one liter pyrex Erlenmeyer flask fitted with a condenser was added 12.6 g (0.1 mole) of III, 30.4 g (0.1 mole) of V, and 1.0 g of benzophenone. The mixture was dissolved in 600 ml acetone then irradiated with light from a GE sunlamp. Several crops of (II) were filtered off at approximately 18 h intervals. After 55 h, the filtrate was concentrated to one-half its original volume to obtain the final crop.

The yield was 73%; mp, 358°-61° C. (dec). Sublimation occurred at a temperature below 300° C. Analysis: Calcd. for $C_{26}H_{22}O_6$: C,72.56; H,5.12. Found: C,72.34; H,5.20. The $^{13}C$ nmr spectrum is consistent with the structure set forth herein.

| C atom | $^{13}C_{\delta tms}$ | C atom | $^{13}C_{\delta tms}$ |
|---|---|---|---|
| a | 173.4 ppm | g | 16.0 |
| b | 170.9 | h | 137.4 |
| c | 47.0 | i | 128.1 |
| d | 37.6 | j | 127.8 |
| e | ? | k | 126.7 |
| f | 50.2 | | |

EXAMPLE 3

Dianhydride I was crystallized from acetone and dried at 120° C. for 18 h. Dodecamethylene diamine (DDA) was distilled under vacuum. DDA, 2.0 g (0.01 mol), was placed in the reaction flask and dissolved in 30 ml of N-methyl-2-pyrrolidinone (NMP) while purging with nitrogen. Compound I, 2.78 g (0.01 mol), was then added all at once and the addition funnel was washed into the flask with another 15 ml of NMP. The mixture was stirred at 25° C. for 1 h, 100° C. for 1 h, and 150° C. for 1 h. At this temperature, 20 ml of NMP were distilled off with most of the water by-product. The solution which at this point became viscous was heated at 250° C. for 3 h. After cooling to 25° C. the polymer solution was mixed with water in a blender. The polyimide was filtered, washed with water and dried in a vacuum oven at 150° C. for 20 h. Nitrogen analysis: Calcd. for $C_{26}H_{38}N_2O_4$: 6.3%. Found: 6.4%.

Measurement of the inherent viscosity (I.V.) for this polymer and all polymers in the following examples was carried out on a solution made by dissolving 0.1 g of the polymer in 25 ml of a 60/40 mixture of phenol/tetrachloroethane at 130° C. then cooling to 30° C., the temperature at which the measurement was made. I.V. for the polyimide of Example 3 was 0.54 dl/g. A molded specimen had a Tg of 62° C.

EXAMPLE 4

Using 0.01 mole of I and 0.01 mole of hexamethylene diamine (HMDA), a polyimide was prepared according to the procedure of Example 3. It had an I.V. of 0.52 dl/g. Nitrogen Analysis: Calcd. for $C_{20}H_{26}N_2O_4$: 7.8%. Found: 8.1%. A flexible film was cast from a 20% polyimide solution in NMP by spreading the solution on a glass plate and drying in a vacuum oven at 120° C. for 2 h.

A molded specimen of this sample had a Tg of 113° C.

EXAMPLE 5

HMDA, 0.015 mole was dissolved in 64 ml of NMP. To the solution was added 0.015 mole of I and the mixture was stirred at 25° C. for 1 h. The oil bath temperature was increased to 210° C. and the reaction solution was heated for 4 h. The polyimide obtained by mixing with water and after drying as in Example 3 had an I.V. of 0.77 dl/g.

EXAMPLE 6

Dianhydride I (0.02 mole) was mixed with a slight excess of HMDA (0.021 mole) and the powder was placed in a polymer tube. The tube was evacuated then sealed. It was immersed in an oil bath and heated at 100° C. for 2 h. The oil bath temperature was raised to 150° C. After heating at this temperature for 1 h, the seal was broken and the tube was connected to a vacuum pump and heated at 200° C. for 2 h then at 250° C. for an additional 1.5 h. The tube was cooled gradually. A tough plug was obtained. It had a nitrogen content of 7.5% and an I.V. of 0.40 dl/g.

EXAMPLE 7

The aromatic diamine 4,4'-oxydianiline (ODA), 2.8 g (0.01 mole), was placed in the reaction flask and dissolved in 22 ml of NMP while purging with nitrogen. I was added as a powder during a 5 min. period. The addition funnel was rinsed into the flask with 8 ml of xylenes. The mixture was heated to 250° C. for 3 h. Approximately 10 ml of the solvent that contained most of the water by-product was distilled off. The polyimide was precipitated by mixing with water. It was dried in a vacuum oven at 125° C. for 4 h. It had an I.V. of 0.31 dl/g. Analysis: Calcd. for $C_{26}H_{22}N_2O_5$: N, 6.3%. Found: N, 6.0%.

EXAMPLE 8

The polymerization reaction between the diphenyl-substituted dianhydride II and DDA was carried out as in Example 3. Thus, 1.8 g (0.009 mole) of DDA was dissolved in 50 ml of NMP. To the solution was added 3.87 g (0.009 mole) of II and heated as in Example 3. The polyimide obtained had an I.V. of 0.33 dl/g. Nitrogen Analysis: Calcd. for $C_{38}H_{46}N_2O_4$: 4.7%. Found: 4.9%. A molded specimen had a Tg of 109° C.

EXAMPLE 9

The reaction in Example 8 was repeated. A higher-molecular weight polyimide was obtained. The polyimide had an I.V. of 0.62 dl/g and a nitrogen content of 4.9%.

EXAMPLE 10

Using 3.87 g (0.009 mole) of II and 1.05 g (0.009 mole) of HMDA and 50 ml NMP a polyimide was prepared according to the procedure of Example 3. It had an I.V. of 0.38 dl/g. Nitrogen Analysis: Calcd. for $C_{32}H_{34}N_2O_4$: 5.5%. Found: 6.2%. A molded specimen had a Tg of 175° C.

EXAMPLE 11

A reaction was carried out between II and HMDA by azeotroping the water by-product with xylenes. Thus, 5.38 g (0.0125 mole) of II was added all at once to a solution of 1.45 g (0.0125 mole) of HMDA in a solvent mixture made up of 40 ml NMP and 10 ml xylenes. The reaction flask was fitted with a Dean-Stark trap. The mixture was stirred at 50° C. for 0.5 h, then heated at 200° C. for 3 h. The polyimide which was precipitated with water and dried at 100° C. for 4 h had an I.V. of 0.54 dl/g and a nitrogen content of 5.6%.

We claim:

1. A process for the manufacture of bicyclo(4.2.0)octane-7,8-dimethyl-3,4,7,8-tetracarboxylic acid dianhydride which comprises reacting equimolar amounts of dimethyl-maleic anhydride and cis-4-cyclohexene-1,2 dicarboxylic anhydride in the presence of benzene wherein the reaction is irradiated by light.

* * * * *

UNITED STATES PATENT OFFICE
CERTIFICATE OF CORRECTION

Patent No. 4,507,186        Dated March 26, 1985

Inventor(s) TAYSEER S. NIMRY - ELLIS K. FIELDS

It is certified that error appears in the above-identified patent and that said Letters Patent are hereby corrected as shown below:

Patent

| Column | Line | | | |
|---|---|---|---|---|
| 1 | 11 | "(1)" | should be | -- (I) -- |
| 4 | 28 | "example" | should be | -- examples -- |
| 4 | 34 | "EXAMPE" | should be | -- EXAMPLE -- |
| 5 | 28 | "preferred" | should be | -- prepared -- |

Signed and Sealed this

Eighth Day of October 1985

[SEAL]

Attest:

Attesting Officer

DONALD J. QUIGG

Commissioner of Patents and Trademarks—Designate